Sept. 13, 1960 J. E. HAYDEN, JR., ET AL 2,952,157
SPECIFIC GRAVITY MEASURING DEVICE
Filed July 17, 1956 3 Sheets-Sheet 3

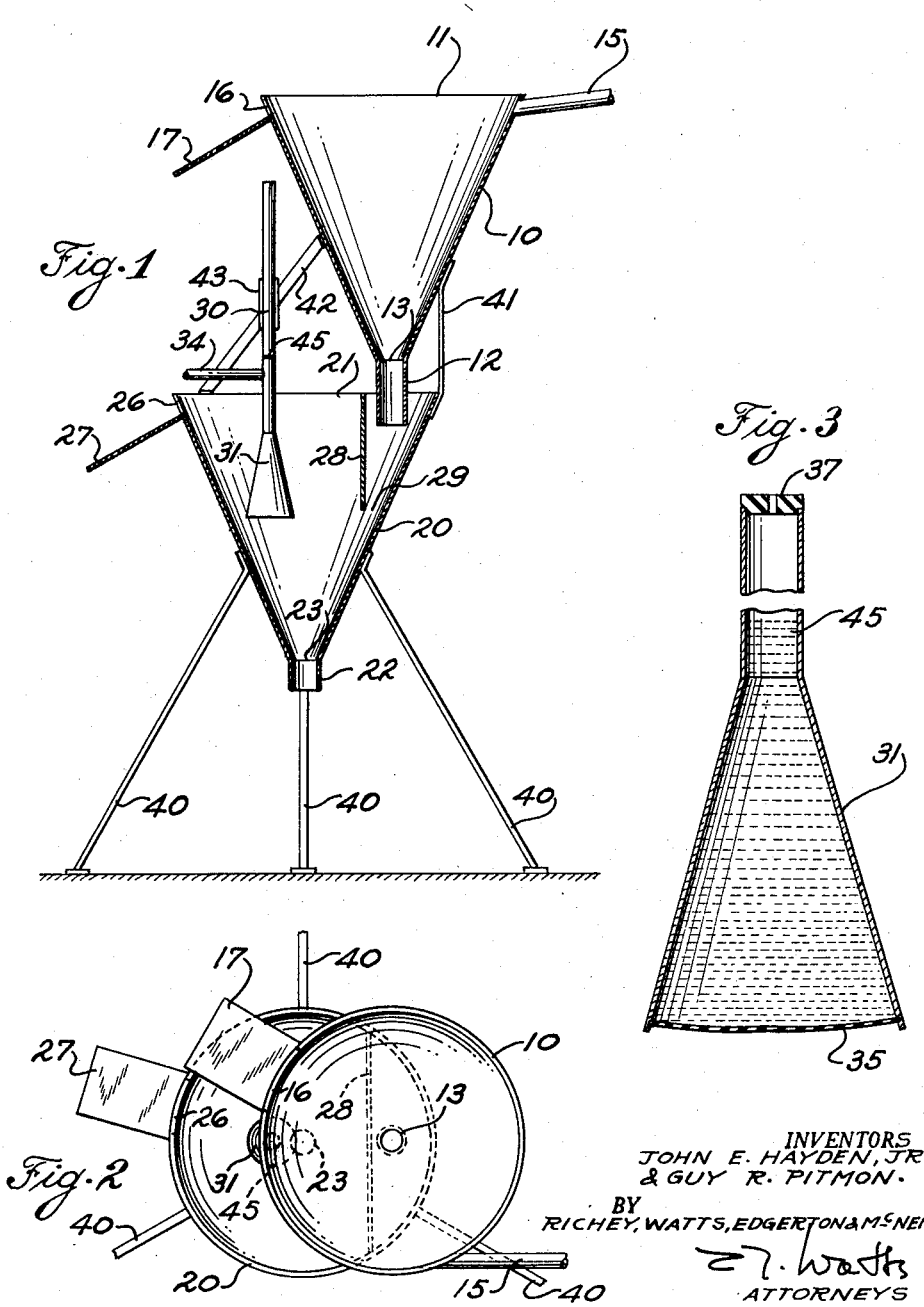

INVENTORS
JOHN E. HAYDEN, JR.
& GUY R. PITMON.
BY
RICHEY, WATTS, EDGERTON & McNENNY
ATTORNEYS

United States Patent Office 2,952,157
Patented Sept. 13, 1960

2,952,157

SPECIFIC GRAVITY MEASURING DEVICE

John E. Hayden, Jr., Crystal Falls, Mich., and Guy R. Pitmon, Taconite, Minn., assignors to The Cleveland-Cliffs Iron Company, Cleveland, Ohio, a corporation of Ohio Filed July 17, 1956, Ser. No. 598,312

6 Claims. (Cl. 73—438)

The present invention relates generally to the weighing art and is more particularly concerned with novel specific gravity measuring apparatus having special utility in continuously determining density of suspensions and especially suspensions of ferrosilicon and magnetite in water as used in heavy media operations in ore beneficiation processes.

It is important to maintain control over the density of heavy media suspensions used in commercial ore dressing operations. Failure to maintain density of such media within certain limits will result in poor separations of gangue or ore and the recovery of an ore product below grade or in diminished yields of ore. It has accordingly become accepted practice in ore dressing operations to measure suspension gravity at intervals so that necessary adjustments can be made to maintain good operating conditions insofar as the media density factor is concerned.

Various density metering devices are available for general use but none of those known heretofore has proven to be practical or satisfactory as applied to ferrosilicon or magnetite suspensions such as those circulated in iron ore treatment. The open tube type, such as air bubble tubes, tend to become plugged by such suspensions. Furthermore, even when these devices are in good working order they are subject to gross error which prior to this invention could not be reliably predicted, satisfactorily compensated or substantially eliminated.

The present invention which is based upon our discoveries to be described below enables close control over the density of circulating heavy media suspensions at all times during the operation of an ore dressing process. Furthermore, this continuous determination or measurement of specific gravity of suspensions of solids in water can be accomplished with apparatus which is relatively inexpensive to manufacture and install and is easy to maintain and operate in full capacity service over long periods and which is free from the errors, failures and deficiencies of the prior density measuring devices. Still further the present apparatus does not in any way impair or limit the ore-separating capacity of conventional heavy media processes. In addition, the present novel apparatus can be used to record data gathered in respect to specific gravity and fluctuations therein over practically any desired period of heavy media process operation.

It is an additional important advantage of this invention that it provides a novel process or method for measuring the specific gravity or fluctuations therein of heavy media-type suspensions without the necessity for modifying these suspensions in any way and without the necessity for testing every increment or even the large proportion of the bulk of a body of such a suspension.

One of the important discoveries underlying this invention is that heavy media suspensions of solids in water can be maintained substantially uniform in constitution in an underflow-overflow system. Another of our discoveries that effective control over the density of heavy media suspensions of this type can be maintained without actual or absolute specific gravity measurement and wholly on an empirical basis. Still further, we have found that any differentials in specific gravity values occurring in the apparatus of this invention can be compensated in the course of calibrating the equipment at the outset of operation. We have additionally found that the marked tendency of suspensions of this type to plug measuring apparatus can be substantially eliminated so that rapid and accurate specific gravity measurements can be made continuously and while such suspensions are in use in an ore processing system, i.e. in the return portion of a processing circuit.

In one of its aspects our invention constitutes a new process or method which, broadly stated, comprises the steps of bringing a suspension to be tested into contact with a first vessel in a closed system which includes in addition a second vessel and displacing gas from one of these vessels and simultaneously introducing gas into the other vessel in this system in proportion to deviations in suspension specific gravity from a predetermined value. This process includes the further step of desiccating gas flowing through this system between the two vessels, the step of intermittently heating the second vessel in order to maintain gas therein at a temperature in a predetermined temperature range and the additional step of metering or throttling gas flow through the system to dampen surging effects during abrupt changes in apparent specific gravity.

As we presently prefer to carry out this novel method, it includes additional procedures or steps. Thus, a suspension to be tested is delivered continuously into a suitable vessel and is continuously withdrawn simultaneously from a point near the bottom of the vessel and from a point near the top of the vessel so that a predetermined level of suspension in the vessel is maintained and a suspension pool zone of minimum turbulence is created within the vessel. This method further includes the step of immersing a specific gravity-measuring device in the said pool, and within the general definition of our present invention set out above, the suspension to be tested is thus brought into contact with the specific gravity measuring means and its density is determined by the novel gas displacement procedure hereinbefore generally described.

With reference to the drawings accompanying and forming a part of this specification:

Fig. 1 is a vertical sectional view of the apparatus embodying this invention, parts being broken away for clarity;

Fig. 2 is a top plan view of the apparatus of Fig. 1;

Fig. 3 is an enlarged, fragmentary, sectional view of the hydrostatic tube of the Fig. 1 apparatus;

Figure 4:
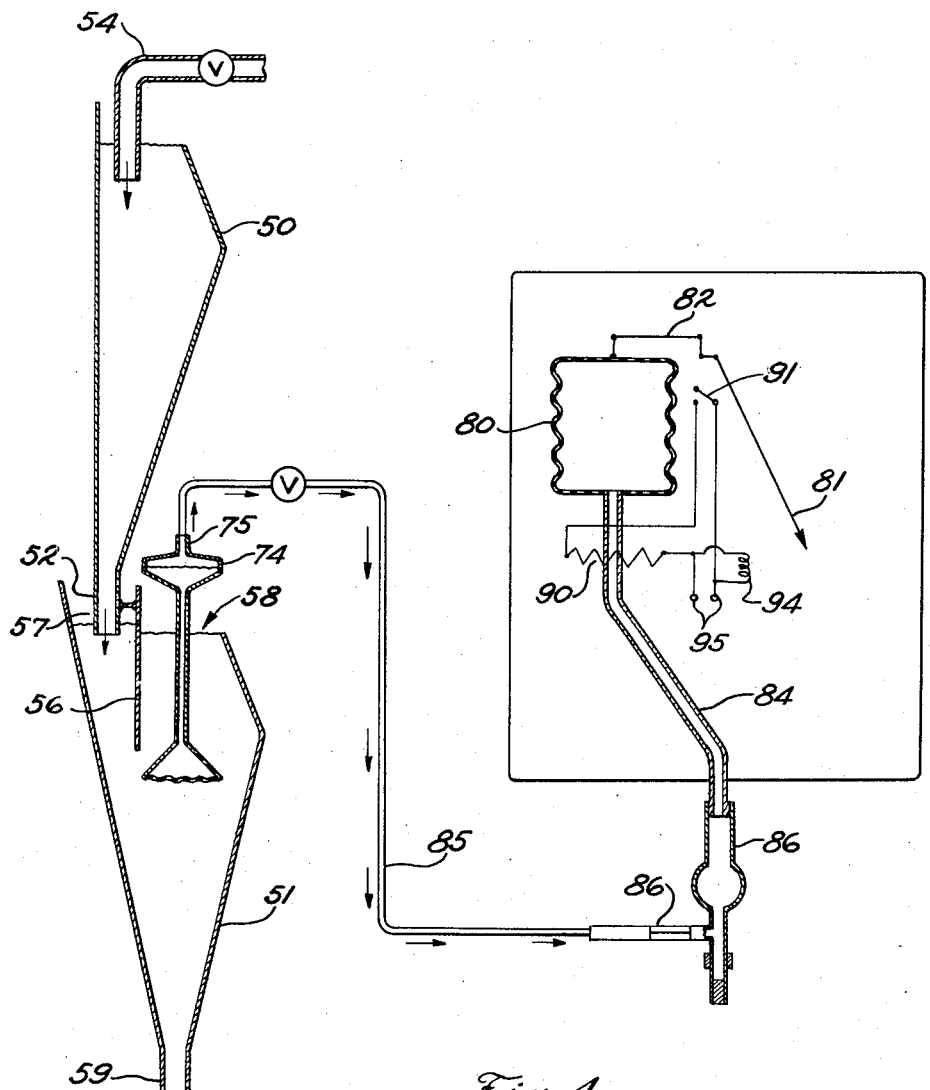
Fig. 4 is a partly diagrammatic, vertical sectional view of a specific gravity measuring system of this invention.
Figure 7:
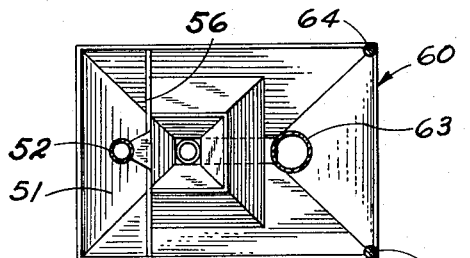
Fig. 7 is a transverse sectional view of the apparatus in Fig. 5 taken on line 7—7 thereof, parts being removed for clarity; and, Fig. 8 is a top plan view of the upper part only of the Fig. 5 apparatus.
Figure 8:
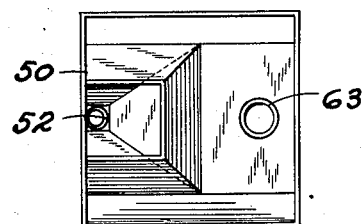

As indicated in these drawings, in its apparatus aspect this invention, generally described, comprises an upper vessel having a discharge opening in a lower portion directed generally downwardly and a lower vessel disposed adjacent to the lower part of the upper vessel to receive suspension discharged from the lower end of the upper vessel and having a discharge opening in its lower portion which is likewise directed generally downwardly. Baffle means is provided in the lower vessel, dividing the upper part of the lower vessel into an inlet zone for underflow discharge from the upper vessel and an overflow zone, and a specific gravity-sensing device is disposed in the lower vessel overflow zone for contact with suspensions to be tested.

In another of its apparatus forms our invention concept may be described as comprising a tubular body having a bulb-like lower end and having a diaphragm to be disposed below the surface of and in contact with a mass of suspension to be treated, an elongated intermediate portion of reduced cross section, and an upper bulb-like end to contain a gas and communicate through said intermediate portion with the lower end so as to constitute a compression chamber. This apparatus also includes gauge means communicating with said upper bulb-like portion to sense and indicate pressure fluctuations in the compression chamber.

A novel gauge of this invention comprises a pressure bellows to expand and contract with fluctuations in internal gas pressure, indicator means connected to the bellows for motion as the bellows expands and contracts to indicate dimension changes in the bellows, a gas tube connected to the bellows for communication with a source of gas subject to pressure changes, and heating means for increasing the temperature of gas in the bellows and thermostatic means for controlling the heating means in order to keep the gas in the bellows within a predetermined temperature range.

The apparatus of Fig. 1 is of two compartments, one above the other, the upper one being defined by an inverted top or feed cone 10 which is open at its upper end or base 11 and is provided with a bottom discharge pipe 12 which receives the heavy media suspension through an apex opening 13 in the vessel. A suspension feed inlet pipe 15 is connected to the vessel 10 near its upper end portion and at a diametrically opposed point in the upper part of this vessel the wall is cut-way to provide an overflow launder opening 16. A launder plate 17 is secured to the vessel 10 adjacent to the lower edge of opening 16 for the purpose of carrying off overflow media from the vessel to a suitable collection point.

The lower compartment is defined by an inverted lower cone 20 which is likewise open at its upper or base end 21 and has a bottom discharge pipe 22 communicating with the interior of the cone through an opening 23 in its apex portion. A launder opening 26 in the upper portion of the cone is provided generally below the launder 17 of the upper cone and a launder plate 27 is secured to vessel 20 for the purpose of carrying off overflow to a suitable collection point. A generally vertically disposed baffle plate 28 is mounted in vessel 20 adjacent to the lower end of bottom discharge pipe 12 to control the course of flow of heavy media from the underflow outlet of cone 10 into and through cone 20. Thus, the lower extremity of plate 28 defines a restricted passageway 29 with the opposing adjacent wall portion of vessel 20 generally directly below the lower end of pipe 12.

A hydrostatic tube 30 having a bulb-like lower end portion 31 is disposed in generally vertical position with portion 31 extending to a point about one-half the depth of vessel 20. The upper end portion of tube 30 is of relatively reduced diameter and is elongated by comparison with portion 31 to facilitate determination of liquid level and fluctuations therein within the hydrostatic tube device. A branch tube 34 of reduced diameter approximating the diameter of the upper end portion of tube 30 opens into the hydrostatic tube at a point above the top of vessel 20 for a purpose to be described. The lower open end of tube 30 is closed against entry of heavy media into the tube by means of a flexible and resilient diaphragm 35, suitably of natural rubber or similar material, which will be affected by the gravity and pressure differences between the inside and outside of the tube portion immersed in heavy media to be tested. The upper end of the hydrostatic tube is provided with a cap 37 of rubber or similar material having an opening for flow of air into and out of the tube as the liquid level in the tube upper portion fluctuates in response to variations in pressure conditions in the diaphragm.

The apparatus is supported by means of three legs 40 engaging vessel 20 at 120° intervals and by means of legs 41 and 42 secured to the upper end of vessel 20 and extending upwardly and engaging vessel 10. Tube 30 derives its support from leg 42 by means of a clamp 43.

In the operation of the apparatus illustrated herein with the parts assembled as shown in Fig. 1, a liquid, suitably water, is charged into tube 30, filling it to the level 45 above tube 34. A part of the circulating heavy media suspension whose specific gravity is to be measured is then run into the apparatus through feed pipe 15 so that upper cone 10 and lower cone 20 are rapidly filled to overflow level. The feed rate is then reduced according to the capacities of the overflows and underflows to maintain it substantially constant at the rate corresponding to the volume of the flows from the vessels. By virtue of the fact that the water in tube 30 is caused to rise in the tube a distance which is proportional to the specific gravity difference between the water and the heavy media surrounding portion 31 of the tube assuming a constant depth beneath the surface of the media of diaphragm 35, variations in density of the heavy media may be detected by noting fluctuations in the level of the water in tube 30. Thus, a continuous visual means of determining relative gravity of heavy media in the circuit, and particularly in the feed portion of the heavy media process, is provided. Calibration may be carried out at the outset to establish a guide in the reading of the hydrostatic tube during the operation of this apparatus.

The liquid used in the hydrostatic tube of this Fig. 1 apparatus of this invention should be of specific gravity substantially less than the specific gravity of the medium to be tested. Furthermore, for consistently satisfactory results, the hydrostatic tube should be mounted in such a manner that diaphragm 35 is maintained at a constant depth in the media during testing operations since the pressure differential across the diaphragm will vary according to the level of the diaphragm within the media mass.

Referring to Figs. 4 to 8, inclusive, the suspension-containing portion of the apparatus therein illustrated is generally similar to the apparatus shown in Fig. 1. Thus an upper underflow-overflow vessel 50 and a lower underflow-overflow vessel 51 are provided, the latter being disposed below vessel 50 in telescopic relation to the lower or apex end 52 vessel of vessel 50. The upper vessel is of modified pyramid shape with its base disposed upwardly and tapered to provide a restricted end opening in which is disposed the discharge end of pulp feed pipe 54. Lower vessel 51 is likewise of generally pyramid shape, but is provided with baffle means in its upper portion in the form of a vertically disposed plate 56 which divides the upper part of vessel 51 into an inlet zone 57 and an overflow zone 58. The lower end of plate 56 is spaced from the adjacent side wall of vessel 51 to provide a restricted opening into the lower part of vessel 51. A portion of the suspension thus is discharged from vessel 51 through zone 58 and the remainder leaves by way of the lower apex end 59 where a suitable opening is provided for generally downward discharge.

We have found that superior flow characteristics are established and maintained through the use of apparatus including vessels 50 and 51. This type of apparatus combines high capacity with regular, even flow conducive to continuous accurate measurement of suspension density. In other words the rate of delivery of suspension into this apparatus through line 54 can be relatively great without marked "boiling" action due to air entrainment in the critical region of vessel 51, i.e. where a density-sensing device would normally be situated. As indicated above, this result is attributable to the construction and conformation of vessels 50 and 51 and their relation to each other in this system, and particularly to baffle means of vessel 51 and the tapered base portions of these two vessels.

As shown in Figs. 5 to 8 inclusive, vessels 50 and 51 are assembled with, and in part supported by, a housing or shell 60 comprising an upper portion 61 secured to the top of vessel 50 and disposed to receive overflow therefrom. A lower unit 62 extends the full height of vessel 51 and similarly is disposed to receive overflow and by means of a vertically-extending conduit 63 suspension over-flowed from vessel 50 is delivered into unit 62 for return to ore processing operations via a pipe 66 opening into the lower end of unit 62. A pair of vertically-disposed supporting members 64 extend upwardly from the outer extremity of unit 62 and are attached to the outer corners of unit 61.

Figure 5:
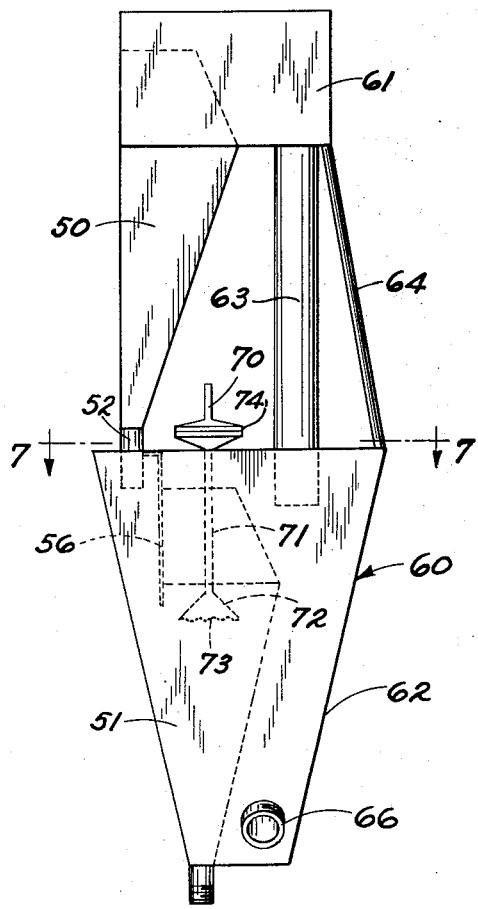
Fig. 5 is a side elevational view of the apparatus of a portion of the apparatus shown in Fig. 4.
Figure 6:
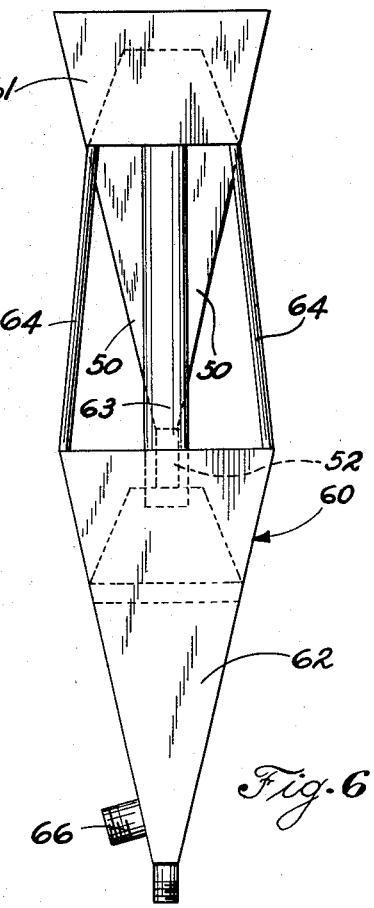
Fig. 6 is an end elevational view of the apparatus of Fig. 5.

The specific gravity-sensing device of the Fig. 4 apparatus, as shown in Figs. 4 and 5, is disposed in vessel 51 and partly submerged therein. This device comprises a hollow body 71 having bulb-like or funnel-shaped lower end portion 72 which is closed by a diaphragm 73, suitably of rubber-like material. An upper bulb-like portion 74 communicates with portion 73 through body portion 71 and constitutes a compression chamber. In normal use this device contains a liquid such as water at the level indicated in Fig. 4 in compression bulb 74. The top of chamber 74 is closed except for a nipple-like portion 75 for connection to a suitable gauge for measuring fluctuations in gas pressure in bulb 74.

The gauge means of this invention, as shown in Fig. 4, includes a gas tight bellows 80 to which indicator arm 81 is mechanically connected by an amplifying linkage 82 so that as the dimensions of the bellows change, arm 81 is moved to show fluctuations in suspension gravity as indicated by movement of diaphragm 73. Bellows 80 thus is connected in a closed, gas-tight system to compression chamber 74, a bellows pipe 84 and a compression chamber tube 85 being provided for this purpose. A desiccant-containing tube 86 is coupled to the lower end of bellows pipe 84 and communicates with tube 85 through a capillary tube 86 which serves to dampen gas surges in the system and smooth the motion indicator 81.

We have found that only a small quantity of a good desiccant is required to keep the gas in the bellows and tube 84 dry over a long period of continuous operation of this equipment. Ten to 15 grams of anhydrous magnesium perchlorate ought to be sufficient for this purpose for at least a year of total operating time. We have also discovered that by providing a small amount of light lubricating oil as a film on top of water in compression bulb 74, evaporation of water in the bulb may be substantially reduced.

In order to eliminate temperature as a significant factor in the operation of this gauge device, an electrical resistance heating element 90 is disposed adjacent to bellows 80 and bellows pipe 84. The operation of element 90 is automatically controlled by means of a thermostat switch 91 which, according to our present preference, is adjusted to a temperature of 95° F. Element 90 accordingly maintains bellows gas temperature at a level equal to the highest ambient temperature thus far experienced in the course of operation of this equipment.

A chart clock, diagrammatically indicated at 94, is used with this equipment to provide a record of density fluctuations over a 24-hour period of continuous operation. Clock 94 and heater 90 are suitably connected to a 115-volt alternating current power source 95.

In the operation of Fig. 4 equipment, pulp is delivered into vessel 50 through line 54, the rate of introduction of pulp into the apparatus being regulated by a suitable valve so that vessels 50 and 51 are filled and continuously overflowed. Sensing device 70 is then inserted into the pump column in the overflow zone of vessel 51 so that diaphragm 73 is disposed below the lower end of baffle 56. Location of the sensing device is carefully made so that the lower end thereof is at a predetermined depth to within about ⅛ inch. The specific gravity of the pulp then is measured in accordance with heretofore standard practice, several samples of pulp being taken for this determination. When the specific gravity of the pulp is known in terms of absolute figures, air is injected into or removed from the closed system (through the lower end of tube 86) including bellows 80 and device 70 is moved up or down slightly until the recorder arm 81 indicates the proper reading. When, as we prefer, a column of water is used in device 70 a further check is made with the apparatus by the level of water in compression bulb 74. Occasional checks of this equipment may advantageously be made, our preference for this purpose being the prior practice using what is known in the art as a "gravity can."

With the ordinary ferrosilicon suspension, the accuracy of this equipment is well within 0.05 of the actual specific gravity of the medium. Abnormally high viscosities in the medium will lead to recorder readings up to 0.05 higher than the actual specific gravity of the medium, which means that this novel instrument indicates apparent rather than actual density. However, during normal operation it is difficult to decide which is more accurate, the gravity can or this device of our invention.

No day-to-day starting up or shutting down of this apparatus is required except to change recording charts as they are completed. During plant shutdown, vessels 50 and 51 rapidly drain under force of gravity. Diaphragm or membrane 73 serves to hold the detection system intact during periods when there is no pulp flow.

With pulp flowing into this apparatus from pipe 54, which is piped into the main pulp or medium feed line of an ore processing system and vessels 50 and 51 at overflow, incoming pulp is split in the upper vessel into an overflow and an underflow portion. The underflow from vessel 50 discharges into zone 57 of vessel 51 entering below the surface of medium therein. A similar division in the underflow and overflow portions is accomplished in vessel 51 in a continuous manner but because of the location of baffle 56, the flow characterized in the pulp of vessel 51 differs from that normally occurring in vessel 50. Both the overflow from vessel 50 and that from vessel 51 and the underflow from vessel 51 are returned by suitable connections to the main pulp or medium feed line.

Changes in pressure exerted upon diaphragm 73 by the static head of pulp in vessel 51 are transmitted to bellows 80 by gas, preferably air, in the system and the bellows is thus caused to expand and contract. As indicated above, these changes in bellows dimensions are transmitted and amplified through a mechanical linkage to indicator arm 81. A pen or similar marking device (not shown) carried by the indicator arm near its free end may engage a suitable recording chart rotated by chart clock mechanism 94 to provide a continuous record of pulp density.

The apparatus illustrated in Fig. 4, as it has been used in actual pulp density-measuring operations, is capable of indicating and recording from zero to 15 inches of water head. The combined height of vessels 50 or 51 may be on the order of four feet, but it will be understood that this is not a critical limit or feature of this invention and that substantial variations in this dimension and in others of this novel equipment may be made to suit special requirements.

In the ordinary use of this Fig. 4 equipment, the flow of feed pulp into vessel 50 is usually unsteady and there is a substantial amount of air entrained in the pulp despite the fact that the discharge end of pipe 54 is normally disposed below the surface of the pulp overflowing the vessel. Overflow from vessel 50 consequently is quite erratic and large air bubbles in the feed produce a marked "boiling" effect. However, in vessel 51, overflow is relatively steady although there still may be some noticeable fluctuation and air bubbles. As the level of medium or pulp in vessel 51 moves up and down, the actual static pressure at the diaphragm 73 is continuously oscillating about a mean static pressure. Capillary tube 86 serves, as described above, to dampen the surging effects in the system resulting from this oscillation and indicator arm 81 therefore holds rather steady and will produce a thin and steady line on a recorder chart.

By virtue of the fact that vessels 50 and 51 have reversed slopes at their upper ends, solids in the pulp feed are kept from banking and building up around the overflow to create a substantial error.

Those skilled in the art will understand that the presence of liquid in device 70 is not in theory essential to the accurate determination of pulp density. The presence of water or other liquid in this device, in effect, subtracts from the pressure head imposed by the pulp on the diaphragm permitting a certain pressure range to be spread over a greater length on a recorder chart, i.e. a greater movement of indicator 81. In other words, this constitutes a simple way to obtain bellows suppression with a pressure gauge having no bellows.

In one operation which has been carried out satisfactorily with this equipment involving pulp of a specific gravity range of 2.5 to 3.3, diaphragm 73 was immersed in the pulp to a depth of 7 inches and the height of the column of water above the diaphragm was 10 inches. Since a seven inch column of pulp having an average specific gravity of 3.0 should support a column of water 21 inches high, indicator 81 should read 11 inches when the gauge is properldy, i.e. the static head of the pulp minus the static head of the water column. Direct readings of specific gravity may be made by providing a suitable scale for the indicator, as for example, a chart scaled in specific gravity rather than in inches of water.

For some pulps and media having lower gravities it would be more practical to eliminate the water column and have device 70 filled with air or other gas instead. In that event compression bulb 74 would not be required because the air interface would actually be at the diaphragm.

What is claimed is:

1. Apparatus for continuously determining the specific gravity of a flowing stream of suspensions of solids in a liquid, such as those of ferrosilicon and magnetite in water as used in ore beneficiation processes, which comprises an upper vessel positioned to receive a small part of such a stream and to be maintained full to overflowing thereby, a lower vessel positioned to receive a part of the suspensions discharged from said upper vessel and to be maintained full to overflowing thereby, each of said vessels having an open top, a lower portion provided with a restricted opening through which the suspensions flow continuously and side walls diverging upwardly from said restricted openings to the open tops, a baffle in the lower vessel dividing the upper part of the lower vessel into an inlet zone and an overflow zone, the restricted opening of the upper vessel being positioned to discharge suspensions into said inlet zone, said baffle having its horizontal bottom edge positioned at such a predetermined depth in the lower vessel as to maintain a predetermined level of suspension and a suspended pool zone of minimum turbulence within the lower vessel, and a device to sense specific gravities of the suspensions in said overflow zone, said device including a liquid containing tube having a lower end closed by a substantially horizontal flexible diaphragm, said diaphragm being disposed substantially in the horizontal plane at the bottom edge of the baffle.

2. The combination of elements set forth in claim 1 in which the specific gravity sensing device has a diaphragm portion provided with an open bottom and the said diaphragm which closes said open bottom is of sufficient strength to retain a liquid in said device and is of sufficient flexibility to be flexed by variations in specific gravity of suspensions in contact therewith.

3. The combination of elements set forth in claim 1 in which the said specific gravity sensing device has an upper portion communicating at its upper end with a bulb-like portion which contains a gas and constitutes a compression chamber.

4. The combination of elements set forth in claim 3 in which a capillary tube communicates with the said compression chamber of the bulb-like portion and with a gauge.

5. The combination of elements set forth in claim 3 in which a capillary tube communicates with the said compression chamber, a desiccant-containing tube communicates with said capillary tube and a gauge communicates with said desiccant-containing tube.

6. The combination of elements set forth in claim 3 in which a gauge communicates with said compression chamber, heating means is disposed adjacent to the gauge for heating the gas therein and the heating means is provided with thermostat means for control thereby and for maintaining the gas in the gauge at a predetermined temperature.

References Cited in the file of this patent

UNITED STATES PATENTS

| | | |
|---|---|---|
| 1,618,442 | Kiefer | Feb. 22, 1927 |
| 2,003,759 | Reichel | June 4, 1935 |
| 2,056,187 | Hay | Oct. 6, 1936 |
| 2,065,695 | Haultain | Dec. 29, 1936 |
| 2,211,748 | Devenish | Aug. 20, 1940 |
| 2,357,639 | Elias | Sept. 5, 1944 |
| 2,550,031 | Wraith | Apr. 24, 1951 |
| 2,584,945 | Todd | Feb. 5, 1952 |
| 2,617,305 | Dahm et al. | Nov. 11, 1952 |

FOREIGN PATENTS

| | | |
|---|---|---|
| 509,906 | Great Britain | July 24, 1939 |